(12) United States Patent
Zhou et al.

(10) Patent No.: US 8,919,380 B2
(45) Date of Patent: Dec. 30, 2014

(54) SLIDING SWITCH OUTLET MECHANISM

(75) Inventors: Huasong Zhou, Xiamen (CN); Yonghua Chen, Xiamen (CN); Haisong Peng, Xiamen (CN); Jianmin Chen, Xiamen (CN)

(73) Assignees: Xiamen Solex High-Tech Industries Co., Ltd., Xiamen (CN); Huasong Zhou, Xiamen (CN)

( * ) Notice: Subject to any disclaimer, the term of this patent is extended or adjusted under 35 U.S.C. 154(b) by 55 days.

(21) Appl. No.: 13/813,486

(22) PCT Filed: Aug. 18, 2011

(86) PCT No.: PCT/CN2011/078553
§ 371 (c)(1),
(2), (4) Date: Jan. 31, 2013

(87) PCT Pub. No.: WO2012/025028
PCT Pub. Date: Mar. 1, 2012

(65) Prior Publication Data
US 2013/0153067 A1 Jun. 20, 2013

(30) Foreign Application Priority Data

Aug. 23, 2010 (CN) .......................... 2010 1 0260258
Aug. 23, 2010 (CN) ....................... 2010 2 0501562 U

(51) Int. Cl.
| F16K 11/02 | (2006.01) |
| B05B 1/16 | (2006.01) |
| F16K 11/044 | (2006.01) |
| F16K 11/07 | (2006.01) |
| B05B 1/18 | (2006.01) |

(52) U.S. Cl.
CPC ............... *F16K 11/02* (2013.01); *B05B 1/1618* (2013.01); *F16K 11/044* (2013.01); *F16K 11/07* (2013.01); *B05B 1/18* (2013.01)
USPC .................... 137/625.48; 137/625.5; 251/297

(58) Field of Classification Search
USPC ......... 137/625, 625.48, 625.5, 862, 872, 874; 251/297, 349
See application file for complete search history.

(56) References Cited

U.S. PATENT DOCUMENTS 2,524,142 A * 10/1950 Seeloff ........................... 251/324
3,707,168 A * 12/1972 Boelkins .................. 137/625.48

(Continued)

FOREIGN PATENT DOCUMENTS

| CN | 2714907 Y | 8/2005 |
| CN | 2922749 Y | 7/2007 |

(Continued)

*Primary Examiner* — Stephen M Hepperle
*Assistant Examiner* — Umashankar Venkatesan
(74) *Attorney, Agent, or Firm* — Rabin & Berdo, P.C.

(57) ABSTRACT

A sliding switch outlet mechanism has a sliding unit and a fixed unit. The sliding unit is provided with an inlet cavity and two outlet ends, the inlet cavity is provided with a first and a second end face, the fixed unit comprises an inlet and a sleeve body, the inlet is communicated with the inlet cavity, the inlet cavity of the sliding unit slides axially between two locating positions with respect to the sleeve body, when the inlet cavity is at the first locating position, the second end face is connected to the sleeve body in a sealing manner, and water comes out of the first outlet end, and when the inlet cavity is at the second locating position, the first end face is connected to the sleeve body in a sealing manner, and water comes out of the second outlet end.

10 Claims, 9 Drawing Sheets

(56) References Cited

U.S. PATENT DOCUMENTS

| | | | |
|---|---|---|---|
| 4,294,286 A * | 10/1981 | Ohumi | 137/625.48 |
| 4,690,171 A * | 9/1987 | Johnston | 137/877 |
| 5,645,100 A * | 7/1997 | Chuang et al. | 137/223 |
| 5,868,166 A * | 2/1999 | Miller | 137/625.27 |
| 7,448,411 B2 * | 11/2008 | Friedman et al. | 137/625.48 |
| 8,567,758 B2 * | 10/2013 | Bouten | 251/129.1 |
| 2007/0068587 A1 * | 3/2007 | Utterberg et al. | 137/872 |
| 2007/0144595 A1 * | 6/2007 | Geva | 137/625.48 |
| 2010/0043895 A1 * | 2/2010 | Towne | 137/596.14 |

FOREIGN PATENT DOCUMENTS

| | | |
|---|---|---|
| CN | 201326776 Y | 10/2009 |
| CN | 101718355 A | 6/2010 |
| CN | 101940987 A | 1/2011 |
| CN | 201791617 U | 4/2011 |
| GB | 2048721 A | 12/1980 |

* cited by examiner

000000

SLIDING SWITCH OUTLET MECHANISM

FIELD OF THE INVENTION

The present invention relates to a sliding switch outlet mechanism, more particular to a sliding switch outlet mechanism used in the shower device.

BACKGROUND OF THE INVENTION

Chinese patent application (CN200620059005.2, "waterway direction regulating and water division device") discloses an outlet mechanism in which the regulating device and the water division device are uniform, coupling with the spring, the water division device is pushed inward or the outlet tube connected with the water division device is pulled outward, and then different outlets are sealed or opened through the inclined plane corporation, and then waterway switch is achieved. Although the present utility model also discloses the principle of pushing switch waterway, but the defect is presented: the structure of the water division device is complicated, and the locating spring is needed, the demands of the coupling of each component is high, and the outlet tube is easy to break down because of frequent pulling.

SUMMARY OF THE INVENTION

The object of the present invention is to offer a sliding switch outlet mechanism which overcomes the defect of waterway direction regulating division device at the prior.

The technical proposal solving the technical matter in the present invention is:

Sliding switch outlet mechanism, which comprises a sliding unit and a fixed unit, the sliding unit is provided with an inlet cavity and two outlet ends, the inlet cavity is provided with the first and the second end face, the fixed unit comprises an inlet and a sleeve body, the inlet is communicated with the inlet cavity, the inlet cavity of the sliding unit slides axially between two locating positions with respect to the sleeve body, when the inlet cavity is at the first locating position, the second end face is connected to the sleeve body in a sealing manner, and water comes out of the first outlet end, and when the inlet cavity is at the second locating position, the first end face is connected to the sleeve body in a sealing manner, and water comes out of the second outlet end.

In a preferred embodiment, the sliding unit further comprises a first and a second side cover which are respectively arranged at the two ends of the sliding unit, and a plurality of outlet holes are arranged on the outer surrounding surface of each side cover in a penetrating manner.

In a preferred embodiment, the external diameter of the sleeve body is adaptive to the inner cavity of the side cover.

In a preferred embodiment, the sliding unit further comprises a guiding shaft which is arranged in the sliding unit in a fixing manner.

In a preferred embodiment, the sleeve body is sleeved out of the guiding shaft, and a gap communicating with the inlet is provided between the sleeve body and the guiding shaft.

In a preferred embodiment, when at the first locating position, the first outlet holes of the first side cover are communicated with gap and the first outlet end, and the second outlet holes of the second side cover is block; when at the second locating position, the second outlet holes of the second side cover are communicated with gap and the second outlet end, and the first outlet holes of the first side cover is block.

In a preferred embodiment, a mounting hole adaptive to the shaft end of the guiding shaft is arranged at the inner end face of each side cover, the two side covers are connected to the two ends of the guiding shaft in a fixing manner through the two mounting holes.

In a preferred embodiment, the inner end face of the first side cover is the first end face, the inner end face of the second side cover is the second end face.

In a preferred embodiment, the fixed unit is provided with an inlet connector, and the inlet is arranged at the inlet connector, and the inlet connector is connected to the sleeve body in a fixing manner.

In a preferred embodiment, a sliding slot is arranged at the sliding unit, and a sliding cover is connected to the fixed unit and slides in the sliding slot.

In a preferred embodiment, it further comprises a locating unit, the locating unit comprises a locating pin, a spring, a guiding tube and locating holes, and the guiding tube is arranged internal cylinder surface of the sliding unit with respect to the sliding slot, the locating holes are opened external cylinder surface of the sleeve body, and the spring and the locating pin are arranged in the guiding tube in turn.

In a preferred embodiment, the sleeve body can slides axially in the inlet cavity and is provided with three locating positions with respect to the inlet cavity, when it is at the middle position, water flows out of the first outlet hole and the second outlet hole simultaneously.

Compared with the technical proposal at the prior, the benefits of the present invention are: 1 in the present outlet mechanism, the fixed unit is coupling with the sliding unit, and the sliding unit slides axially with respect to the fixed unit, so that the sleeve body of the fixed unit can be alternatively connected to the first end face or the second end face in a penetrating manner, and then water can be switched to flow out of different outlet end with smooth process, and water pressure is skillfully used to automatically locate the first end face or the second end face of the inlet cavity in the sleeve body without returning spring and with simple structure; 2 the sliding unit is provided with two side covers covering the two ends of the sliding unit, it is not only work to fix or decorate, but also penetrating outlet holes are arranged in it to communicated with the first and the second outlet end respectively; 3 because the external diameter of the sleeve body is adaptive to the inner cavity of the side cover, when at the first position, water will not leak out of the second outlet end from the second end face, and when at the second position, water will not leak out of the first outlet end from the first end face, so that the stability and the tightness of the waterway switch are ensured; 4 the guiding shaft is fixedly arranged in the sliding unit and is sleeved in the sleeve body to guide the sliding of the sliding unit; 5 a gap is provided between the guiding shaft and the sleeve body, the gap is communicated with the inlet and slides with the sleeve body to alternatively communicate with the first or the second outlet end; 6 the first and the second outlet holes on the two side covers are coupling with the locating of the first and the second position to alternatively communicate with the inlet cavity with good cooperation and more stable switch process; 7 a mounting hole is arranged on the inner end face of both side cover to fix the guiding shaft in the sliding unit; 8 the inner end faces of the two side cover are indentified to be the first and the second end face respectively, and when at the first or the second position, one of the inner end face of the side covers is connected to the sleeve body in a sealing manner or one of the inner end face of the side covers be away from the sleeve body; 9 because the sliding unit is provided with a sliding slot and a sliding cover, the sliding cover is fixedly connected to the fixed unit, the users only need to slide the sliding cover in the sliding slot, or directly push the sliding unit, the outlet switch of different outlet end of the outlet mechanism can be achieved.

REFERENCE SIGN

Sliding unit—100; inlet cavity—110; first outlet end—120; second outlet end—130; first side cover—140; first outlet hole—141; first end face—142; first mounting hole—143; second side cover—150; second outlet hole—151; second end face—152; second mounting hole—153; guiding shaft—160; gap—161; sliding slot—170; sliding cover—180; fixed unit—200; inlet connector—210; inlet—211; sleeve body—220.

DESCRIPTION OF THE PREFERRED EMBODIMENTS

With the following description of the drawings and specific embodiments, the invention shall be further described in details.
Embodiment 1

According to FIG. 1 to FIG. 5, a sliding switch outlet mechanism is offered in a preferred embodiment in the present invention.

Figure 1:
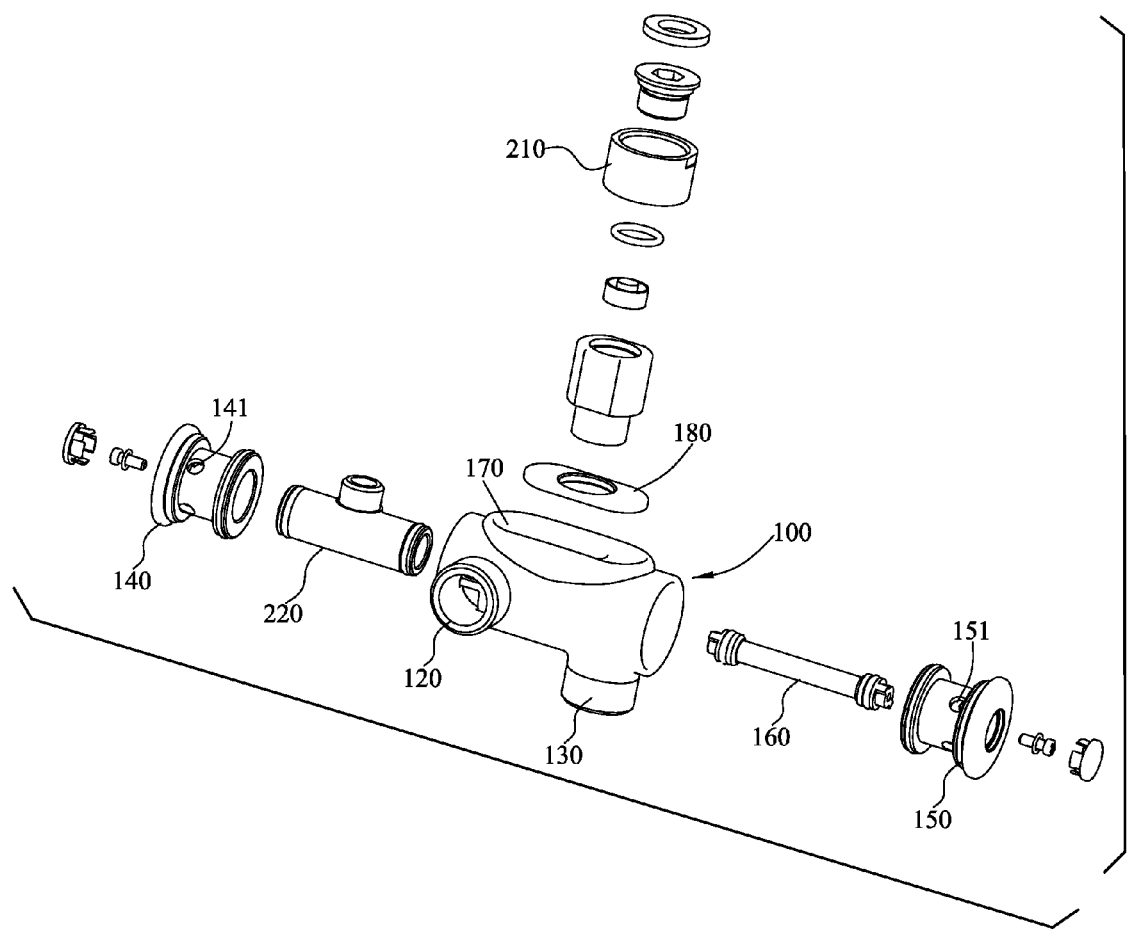
FIG. 1 shows the exploded view of the sliding switch outlet mechanism in embodiment 1.
Figure 2:
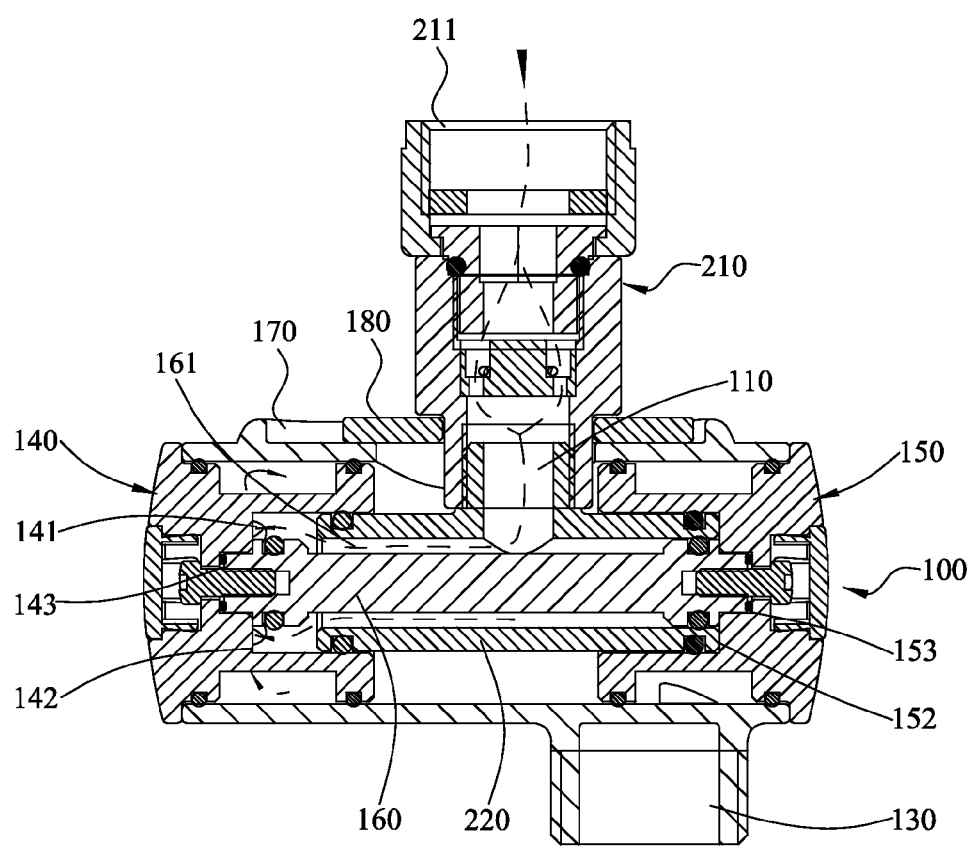
FIG. 2 shows the sectional view of the sliding switch outlet mechanism in embodiment 1 when water comes out of the first outlet end.
Figure 4:
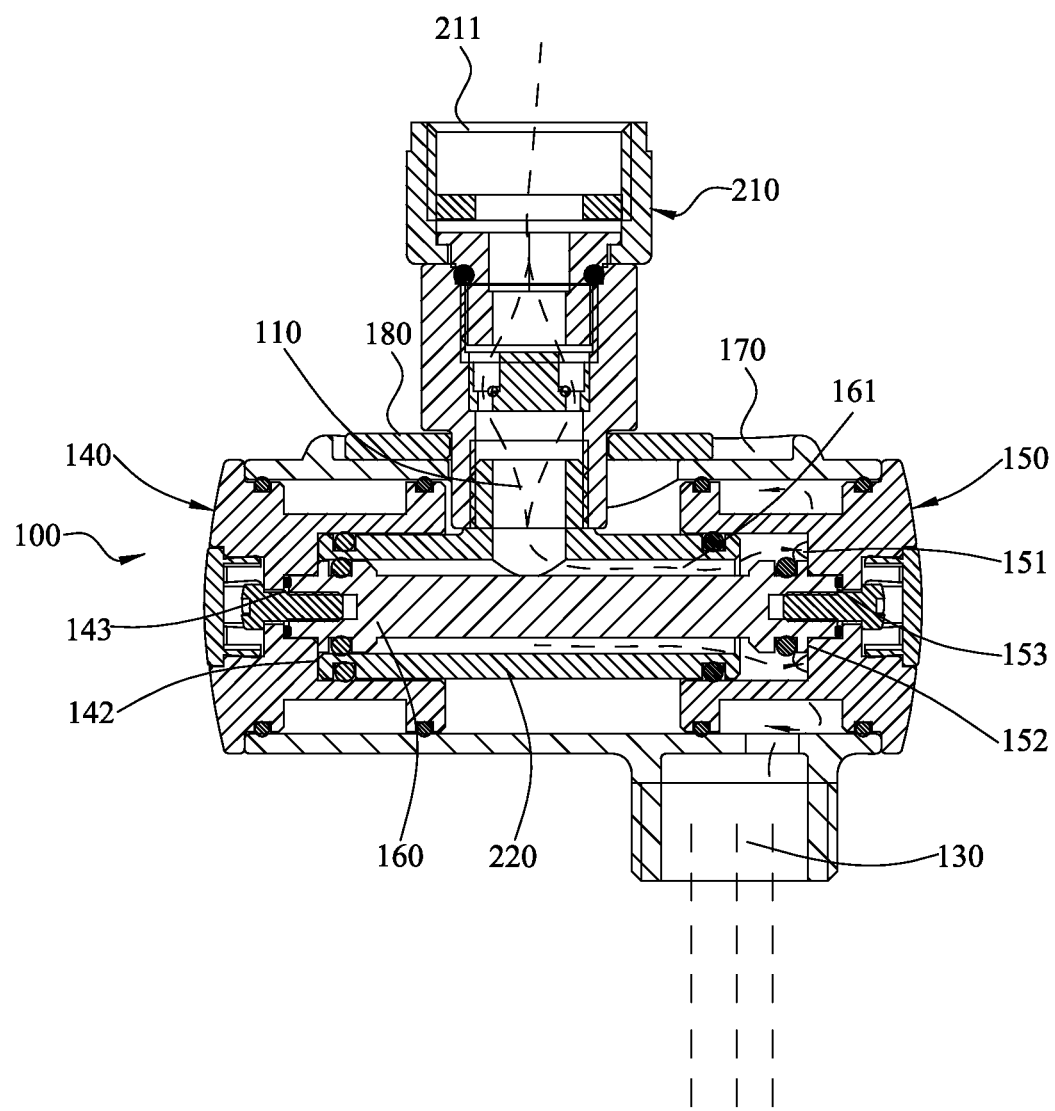
FIG. 4 shows the sectional view of the sliding switch outlet mechanism in embodiment 1 when water comes out of the second outlet end.

According to FIG. 1, FIG. 2 and FIG. 4, the sliding switch outlet mechanism comprises a sliding unit 100 and a fixed unit 200.

The sliding unit 100 comprises an inlet cavity 110, a first inlet end 120, a second inlet end 130, a first side cover 140, a second side cover 150, a guiding shaft 160, a sliding slot 170 and a sliding cover 180, the two outlet ends 120 and 130 are independent to each other and are arranged on different position of the outer surface of the sliding unit 100; the first side cover 140 and the second side cover 150 cover the two ends of the sliding unit 100 respectively, wherein a plurality of the first water passing holes 141 are opened symmetrically on the outer surrounding surface of the first side cover 140 in a penetrating manner and a mounting hole 142 is arranged on the inner end surface 143 of the first side cover 140, and a plurality of the first water passing holes 151 are opened symmetrically on the outer surrounding surface of the second side cover 150 in a penetrating manner and a mounting hole 152 is arranged on the inner end surface 153 of the second side cover 150; two ends of the guiding shaft 160 are fixed in the two mounting holes 142 and 152 respectively to be fixedly arranged in the sliding unit 100; the sliding slot 170 is opened on the top surface of the sliding unit 100, the sliding cover 180 is connected to the fixed unit and can slide in the sliding slot 170.

The fixed unit 200 comprises an inlet connector 210 and a sleeve body, wherein, the inlet connector 210 is provided with an inlet 211 communicating with the water resource and the inlet cavity 110, and the inlet connector 210 passes through the sliding slot 170 and the sliding cover 180 and are screwed with the sleeve body 220, and the sleeve body 220 is arranged in the sliding unit 100, namely in the inlet cavity 110, the external diameter of the sleeve body 220 is coincide with the inner cavities of the side covers 140 and 150 and is sleeved with the guiding shaft 160, a gap 161 communicating with the inlet 211 is arranged between the sleeve body 220 and the guiding shaft 160, and the sleeve body can slide axially in the inlet cavity 110 and is provided with two locating positions with respect to the inlet cavity 110.

Figure 3:
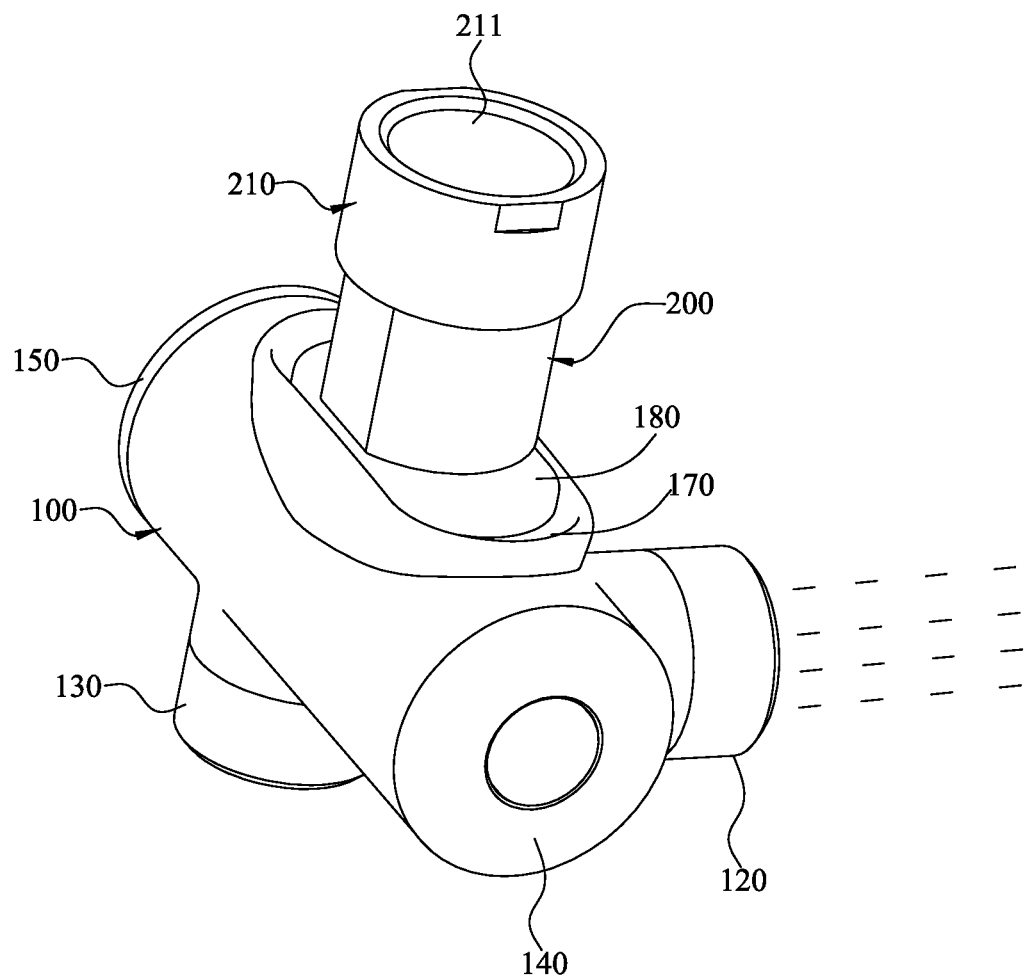
FIG. 3 shows the solid abridged general view of the sliding switch outlet mechanism in embodiment 1 when water comes out of the first outlet end.

FIG. 2 and FIG. 3 shows the abridged general view of the sliding switch outlet mechanism when water comes out of the first outlet end.

The sliding cover 180 is moved to left or the sliding unit 100 is directly pushed, the sliding unit 100 slides to left, and then the second end face 153 of the second side cover 150 is against the sleeve body 220, water enters the inlet cavity 110 from the inlet 211 after water resource is opened, and the second end face 153 is automatically located in the sleeve body 220 under the pressure of water, namely in the first position, because the external diameter of the sleeve body 220 is adaptive to the inner cavity of the side cover 150, the second end face 153 and the end face of the sleeve body 220 are sealed to each other, and the water cannot enter the second outlet holes 151, and then water enters the gap 161 between the sleeve body 220 and the guiding shaft 160, passes through the first outlet holes 141, and at last flows out of the first outlet end 120, and no water comes out of the second outlet end 130 at the moment.

Figure 5:
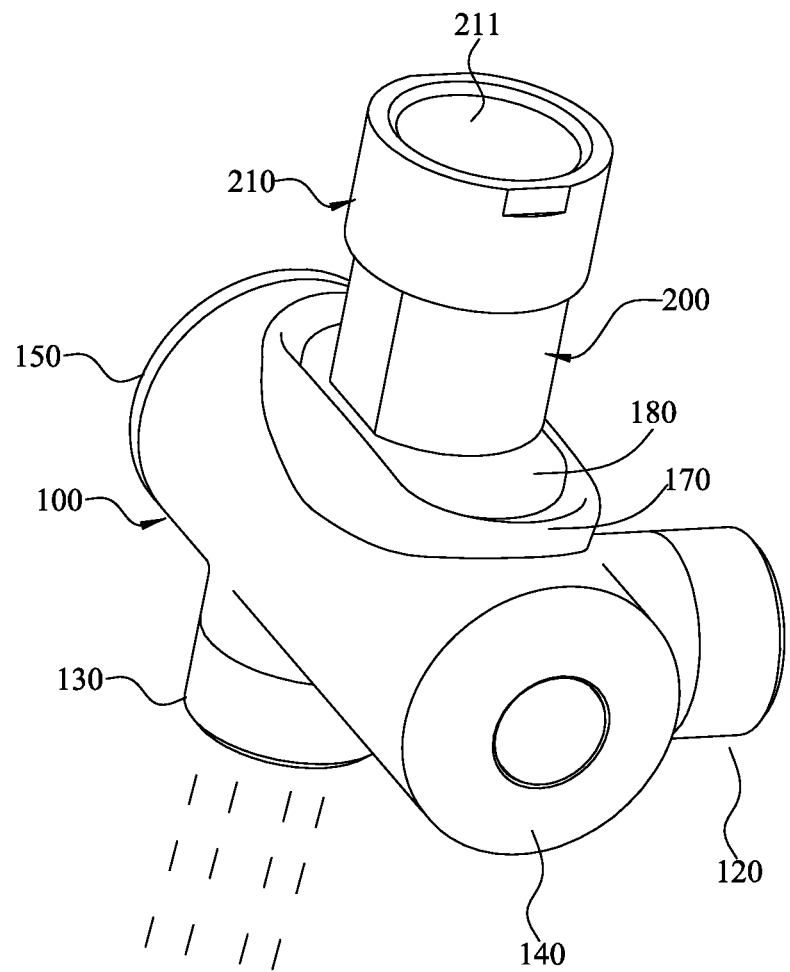
FIG. 5 shows the solid abridged general view of the sliding switch outlet mechanism in embodiment 1 when water comes out of the second outlet end.
Figure 6:
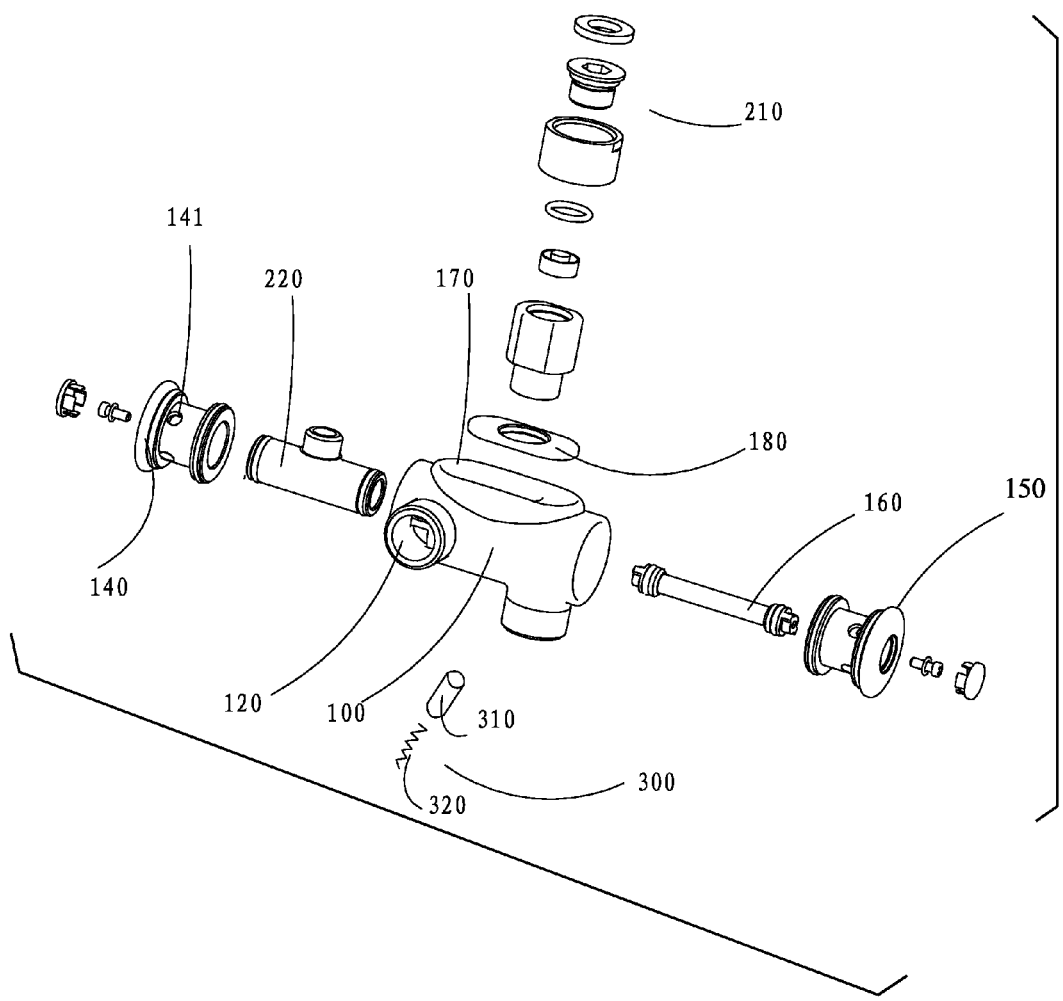
FIG. 6 shows the exploded view of the sliding switch outlet mechanism in embodiment 2.
Figure 7:
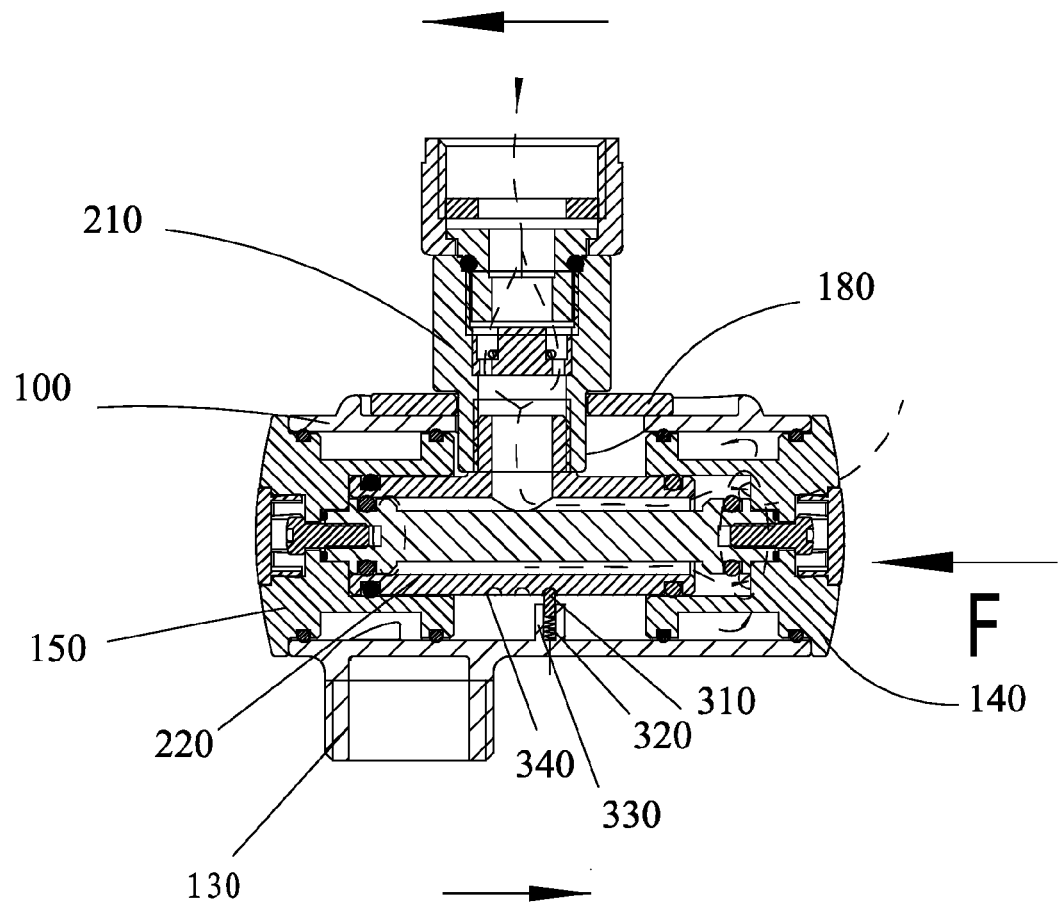
FIG. 7 shows the sectional view of the sliding switch outlet mechanism in embodiment 2 when water comes out of the second outlet end.
Figure 8:
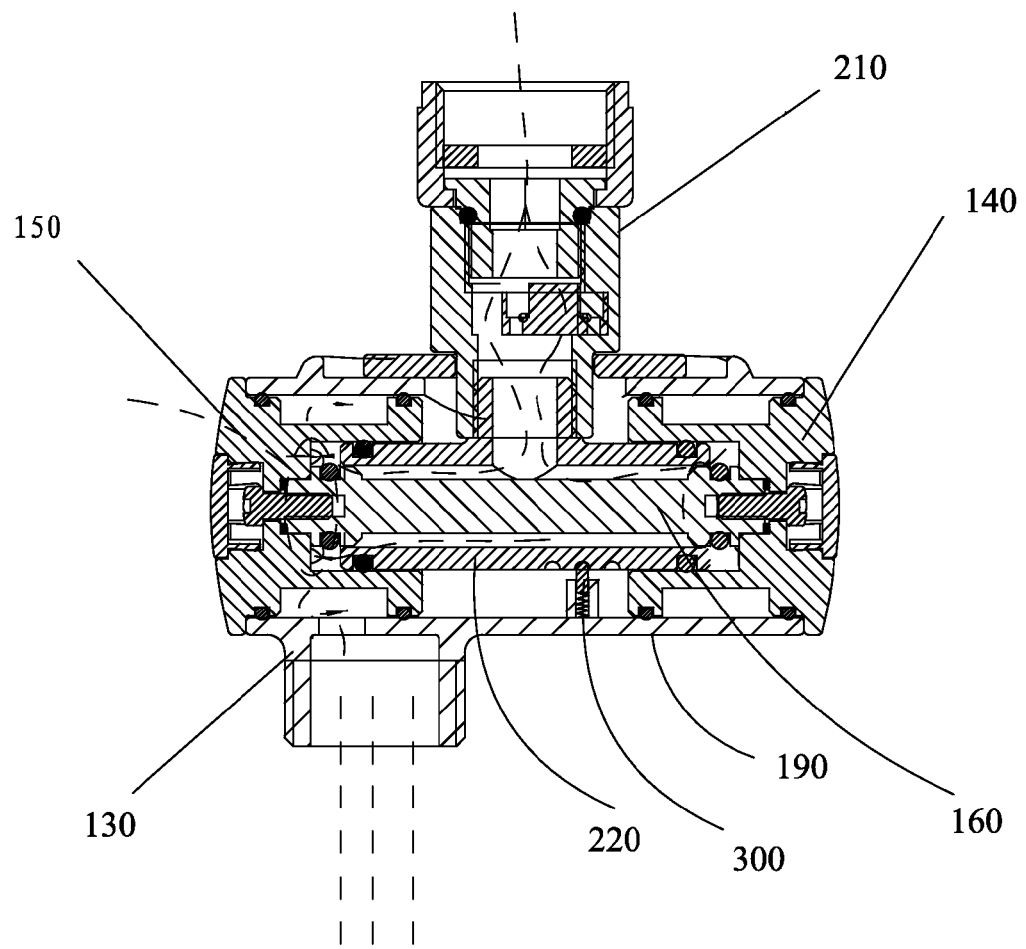
FIG. 8 shows the sectional view of the sliding switch outlet mechanism in embodiment 2 when water comes out of the first and second outlet ends simultaneously.
Figure 9:
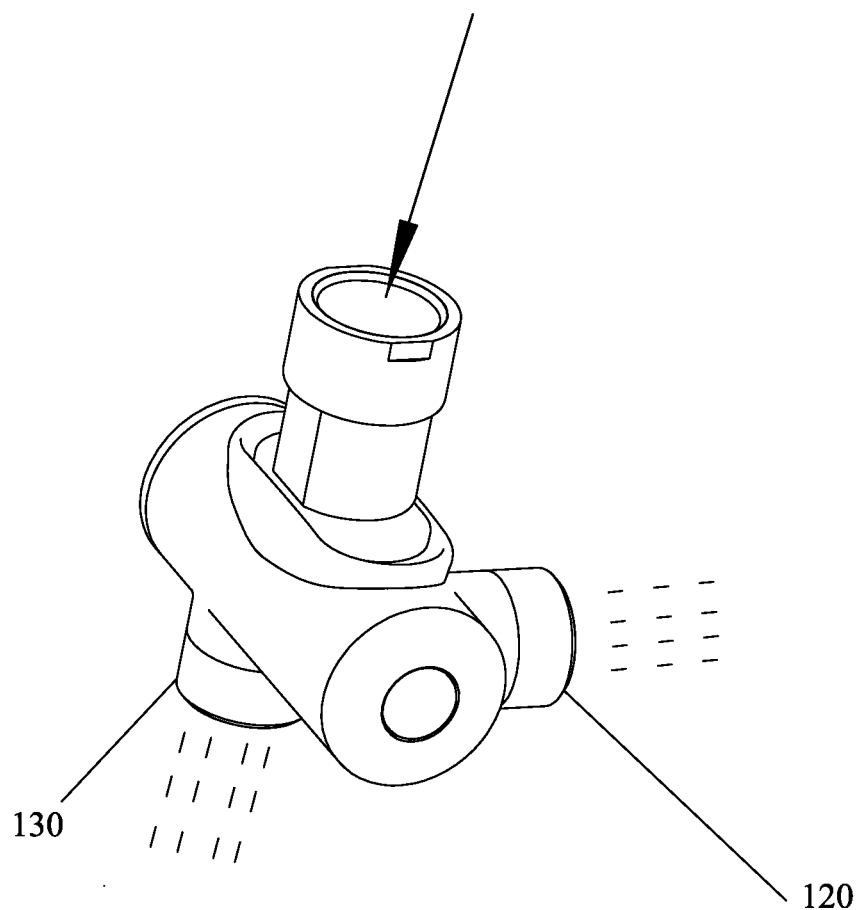
FIG. 9 shows the solid abridged general view of the sliding switch outlet mechanism in embodiment 2 when water comes out of the first and second outlet ends simultaneously.

FIG. 4 and FIG. 5 shows the abridged general view of the sliding switch outlet mechanism when water comes out of the second outlet end.

The sliding cover 180 is moved to right or the sliding unit 100 is directly pushed, the sliding 100 slides to right overcoming water pressure, and then the first end face 143 of the first side cover 140 is against the sleeve body 220, water enters the inlet cavity 110 from the inlet 211 after water resource is opened, and the first end face 143 is automatically located in the sleeve body 220 under the pressure of water, namely in the second position, because the external diameter of the sleeve, body 220 is adaptive to the inner cavity of the side cover 140, the first end face 143 and the end face of the sleeve body 220 are sealed to each other, and the water cannot enter the first outlet holes 141, and then water enters the gap 161 between the sleeve body 220 and the guiding shaft 160, passes through the second outlet holes 151, and at last flows out of the second outlet end 130, and no water comes out of the first outlet end 120 at the moment.
Embodiment 2

According to FIG. 6 to FIG. 9, a sliding switch outlet mechanism is offered in another preferred embodiment in the present invention, which is comprises a sliding unit 100 and a fixed unit 200, the difference from the embodiment 1 is that: the present sliding switch outlet mechanism further comprises a locating unit 300.

The locating unit 300 comprise the locating pin 310, the spring 320, the guiding tube 330 and the locating hole 340; the guiding tube 330 is arranged on the internal cylinder surface 190 of the sliding unit 100 with respect to the sliding slot 170, three locating holes 340 are opened on the external cylinder surface of the sleeve body 220, the spring 320 and the locating pin 310 are arranged in the guiding tube 330 in turn, so that the sleeve body can slide axially in the inlet cavity 110 and is provided with three locating positions with respect to the inlet cavity 110.

During using process, difference is present from the embodiment 1, water can not only be chosen to flow out of the second outlet end 130 or the first outlet end 120, but also be chosen to flow out of the second outlet end 130 and the first outlet end 120 simultaneously. According to FIG. 8 and FIG. 9, the sliding cover 180 is moved or the sliding unit 100 is directly pushed, and the sliding unit 100 slides to the middle position overcoming water pressure, and the locating pin 310 is inserted into the locating hole 340 in the middle position of the sleeve body 220; gaps are present among the two ends of the sleeve body 220, the first end. face 143 and the second end face 153, and water flows into the first outlet holes 141 and the second outlet holes simultaneously, and flows out of the first outlet end 120 and the second outlet end 130.

Just one locating hole 140 can also be opened on the external cylinder surface of the sleeve body 220 middle locating, and the first position and the second position can be the same as the direct two-end positing in the embodiment 1.

The invention has been described with reference to the preferred embodiments mentioned above; therefore it cannot limit the reference implementation of the invention. It is obvious to a person skilled in the art that structural modification and changes can be carried out without leaving the scope of the claims hereinafter and the description above.

Industrial Applicability

The present discloses a sliding switch outlet mechanism, its fixed unit is coupling with the sliding unit, and the sliding unit slides axially with respect to the fixed unit, so that the sleeve body of the fixed unit can be alternatively connected to the first end face or the second end face in a penetrating manner, and then water can be switched to flow out of different outlet end with smooth process and simple structure.

What is claimed is:

1. Sliding switch outlet mechanism, comprising:
   a sliding unit and
   a fixed unit,
   the sliding unit is provided with an inlet cavity and two outlet ends,
   the inlet cavity is provided with a first and a second end face,
   the fixed unit comprises an inlet and a sleeve body,
   the inlet is communicated with the inlet cavity,
   the inlet cavity of the sliding unit slides axially between two locating positions with respect to the sleeve body,
      when the inlet cavity is at the first locating position, the second end face is connected to the sleeve body in a sealing manner, and water comes out of the first outlet end, and
      when the inlet cavity is at the second locating position, the first end face is connected to the sleeve body in a sealing manner, and water comes out of the second outlet end
   wherein, the sliding unit further comprises a guiding shaft which is fixed in the sliding unit, a mounting hole adaptive to a shaft end of the guiding shaft is arranged at an inner end face of each of two side covers, which are fixed to opposite ends of the guiding shaft through the mounting holes.

2. Sliding switch outlet mechanism according to claim 1, wherein,
   the sliding unit further comprises a first and a second side cover which are respectively arranged at the two ends of the sliding unit, and
   a plurality of outlet holes are arranged on the outer surrounding surface of each side cover in a penetrating manner.

3. Sliding switch outlet mechanism according to claim 2, wherein, the external diameter of the sleeve body is adaptive to the inner cavity of the side cover.

4. Sliding switch outlet mechanism according to claim 2, wherein,
   the sleeve body is guided by the guiding shaft, and
   a gap communicating with the inlet is provided between the sleeve body and the guiding shaft.

5. Sliding switch outlet mechanism according to claim 4, wherein,
   when at the first locating position, the first outlet holes of the first side cover communicate with the gap and the first outlet end, and the second outlet holes of the second side cover are blocked; and
   when at the second locating position, the second outlet holes of the second side cover communicate with the gap and the second outlet end, and the first outlet holes of the first side cover are blocked.

6. Sliding switch outlet mechanism according to claim 2, wherein,
   the inner end face of the first side cover is the first end face,
   the inner end face of the second side cover is the second end face.

7. Sliding switch outlet mechanism according to claim 1, wherein,
   the fixed unit is provided with an inlet connector,
   the inlet is arranged at the inlet connector, and
   the inlet connector is fixed to the sleeve body.

8. Sliding switch outlet mechanism according to claim 1, wherein,
   a sliding slot is arranged at the sliding unit, and
   a sliding cover is connected to the fixed unit and slides in the sliding slot.

9. Sliding switch outlet mechanism according to claim 1, further comprising a locating unit,
   the locating unit comprises
      a locating pin,
      a spring,
      a guiding tube and
      locating holes, and
   the guiding tube is arranged inside an internal cylinder surface of the sliding unit with respect to the sliding slot,
   the locating holes are open to an external cylinder surface of the sleeve body, and
   the spring and the locating pin are arranged in the guiding tube in turn.

10. Sliding switch outlet mechanism according to claim 9, wherein,
    the sleeve body can slide axially in the inlet cavity and is provided with three locating positions with respect to the inlet cavity, and
    when it is at the middle position, water flows out of the first outlet hole and the second outlet hole simultaneously.

* * * * *